US009263968B2

(12) United States Patent
Potts et al.

(10) Patent No.: US 9,263,968 B2
(45) Date of Patent: Feb. 16, 2016

(54) BIDIRECTIONAL INVERTER-CHARGER (75) Inventors: Dennis L. Potts, Boulder, CO (US); Brian Houghton, Littleton, CO (US)

(73) Assignee: EETREX, INC., Boulder, CO (US)

( * ) Notice: Subject to any disclaimer, the term of this patent is extended or adjusted under 35 U.S.C. 154(b) by 622 days.

(21) Appl. No.: 13/530,806

(22) Filed: Jun. 22, 2012

(65) Prior Publication Data
US 2013/0057200 A1    Mar. 7, 2013

Related U.S. Application Data (60) Provisional application No. 61/500,060, filed on Jun. 22, 2011.

(51) Int. Cl.
| *H02J 7/00*  | (2006.01) |
| *H02M 7/48*  | (2007.01) |
| *H02M 3/335* | (2006.01) |
| *H02M 1/42*  | (2007.01) |
| *H02J 7/02*  | (2006.01) |

(52) U.S. Cl.
CPC ........ *H02M 7/4807* (2013.01); *H02M 3/33584* (2013.01); *H02J 7/025* (2013.01); *H02M 1/4233* (2013.01); *Y02B 70/126* (2013.01)

(58) Field of Classification Search
CPC ............. H02J 7/022; H02J 9/062; H02J 3/32; H02J 2009/067; H02J 3/02; H02J 7/00; H02J 7/0065; H02J 7/025; H02J 7/1453; H02J 7/1476; H02J 7/34; H02J 3/383; H02J 5/005; H02M 3/33584; H02M 7/4807

USPC ........................... 716/100–108; 320/100–108
See application file for complete search history.

(56) References Cited

U.S. PATENT DOCUMENTS

2010/0231173 A1\* 9/2010 Andrea et al. ................ 320/137
2012/0176090 A1\* 7/2012 Andrea et al. ................ 320/128

FOREIGN PATENT DOCUMENTS

| JP | 2002-272136 | 9/2002 |
| JP | 2004242418  | 8/2004 |

\* cited by examiner

*Primary Examiner* — Binh Tat
(74) *Attorney, Agent, or Firm* — Polsinelli PC (57) ABSTRACT

A bidirectional inverter-charger includes a first stage receiving or delivering energy from a line or to a load. The first stage including at least one inductor coupled with a split phase bridge. A link storage is connected between rails of a first bus and between the first stage and a second stage. The second stage includes a DC-to-DC converter connectable to a battery. The DC-to-DC converter includes a transformer providing galvanic isolation between a second bridge, connected between the rails of the first bus, and a third bridge connected between the rails of a second bus. In operation, the first stage provides power factor correction and a voltage boost while charging the battery and inverting when providing power to the line or the load. The second stage provides a controllable charge current to the battery and a voltage boost of a voltage of the battery to the link storage.

18 Claims, 9 Drawing Sheets

BIDIRECTIONAL INVERTER-CHARGER

CROSS-REFERENCE TO RELATED APPLICATION

The present application is a utility application claiming priority under 35 U.S.C. §119(e) to provisional application No. 61/500,060 titled "BIDIRECTIONAL INVERTER-CHARGER," filed on Jun. 22, 2011, which is hereby incorporated by reference herein.

TECHNICAL FIELD

Aspects of the present invention generally relate to a bidirectional inverter-charger system.

BACKGROUND

Products for converting alternating current (AC) to direct current (DC) are commonly found in the marketplace today. These products, when used to move electrical energy into a battery, are referred to as chargers. Products that convert DC into AC are referred to as inverters.

Hybrid-Electric Vehicles or "HEV" have both an electric drive train and a gasoline or other form of combustion engine. Generally speaking, the electric motor may drive the vehicle, drawing energy from a battery pack alone or in combination with the combustion engine may also power a generator that charges the battery pack. One problem with many existing mass produced HEV's is that the full potential of the hybrid drive system is not realized due to the limited amount of on-board electrical energy storage. This problem is addressed by increasing the energy storage capacity of the vehicle to allow greater use of electricity in place of gasoline, which is being facilitated by technical advances in battery or other energy storage forms, among other things. Higher capacity energy storage systems facilitate charging from an external supply to offset and reduce petroleum fuel consumption that would otherwise be required by the petroleum fueled engine. Such a configuration is known as a Plug-in Hybrid Electric Vehicle or PHEV.

Now consider that PHEV's often have a large capacity battery for electrical energy storage but that stored energy is used only when the vehicle is moving. When the vehicle is at rest the battery system is idle and underutilized. It has been recognized that the energy storage capacity of PHEV's could be utilized to store electrical energy when the power is available and it could be called upon to supply electrical energy when required during times of peak electric grid demand—a concept referred to as Vehicle-To-Grid or V2G. Similarly, as alternative energy supplies, such as from solar and wind, continue to emerge and proliferate, there is a growing need to include energy storage to take full advantage of such alternative energy supplies. In any such arrangement, there is a need to move energy to storage and from storage. So, for example, there is a need to draw energy from a battery pack or store energy in the battery pack.

The conventional unidirectional chargers or inverters can be used to charge a battery or provide AC power from the battery (or other energy storage medium). As PHEV technology matures, V2G and vehicle-to-other technologies emerge, alternative energy sources supply energy to the grid or otherwise and are deployed in conjunction with storage, there is an associated need to improve inverter and charger efficiency, weigh savings, cost savings among other improvements.

SUMMARY

Aspects of the present disclosure involve bidirectional inverter-chargers. With the growing interest in hybrid and electric vehicles, as well as wind power, solar power and power independence, bidirectional inverter/chargers are needed. The present invention may either charge a battery from AC and DC sources or may supply AC power back to the grid, home, worksite, campsite or even another electric vehicle charger from a battery or other DC power source. In the bidirectional topologies disclosed, the same power components are used for either direction resulting in many fewer components, less weight, less space and less cost than the charger and inverter functions implemented individually. Power flow and direction is under programmatic control without the need for mechanical switches or relays. Either isolated or non-isolated topologies may be used, the system may include power factor correction, and the system may be configured for split phase (240/220 VAC) or single phase (120/110 VAC) connections.

More particularly, one aspect of the present disclosure involves a bidirectional inverter-charger. The inverter-charger includes a first stage configured to be coupled between a line of a source of energy (e.g., a 120 VAC or 240 VAC wall socket) or a load of some form and is further coupled with a link storage. The first stage including at least one inductor coupled with a first bridge receiving control signals from at least one digital controller. The first bridge may be a split phase bridge. The various bridges discussed herein may involve different forms of high power transistors and nodes of the bridge may include multiple transistors in parallel depending on the power requirements and current flow, among other concerns. The inverter-charger further includes a second stage coupled between the link storage and the battery, when connected with the battery. The second stage includes a DC-to-DC converter receiving control signals from the at least one digital controller to provide synchronous operation. The DC-to-DC converter further comprises a transfer element, such as a transformer providing galvanic isolation, coupled between a second bridge and a third bridge of the DC-to-DC converter. The second bridge is coupled with the link storage and the third bridge is coupable with the battery. In operation, the first stage provides power factor correction and a voltage boost of the source of power to the link storage while charging the battery and inverting when providing power to the line or the load from the battery. The second stage provides a controllable charge current to the battery while charging the battery and providing a voltage boost of a voltage of the battery to the link storage while inverting the power from the battery.

In another aspect, a bidirectional inverter-charger includes a first stage including a first inductor operable to be coupled with a first line of a source of energy and a second inductor operable to be coupled with a second line of the source of energy. The first stage further includes a first split phase bridge including at least four transistor switches (any switch of a bridge may be implemented in practice through one or many switches operating in parallel) with the first inductor coupled between a first transistor and a second transistor of the split phase bridge and the second inductor coupled between a third transistor of the bridge and a fourth transistor of the bridge. The split phase bridge is connected between a first positive bus and a first negative bus.

The inverter-charger further includes a link capacitor arrangement comprising a first capacitor coupled between the first positive bus and a neutral line of the source of energy, a second capacitor coupled between the neutral line and the first negative bus, and a third capacitor coupled between the first positive bus and the first negative bus. Any given capacitor may be implemented, in practice, by one or more capacitors connected in parallel.

The inverter-charger further includes a second stage coupled between the link capacitor arrangements and configured to connect with a battery, which may be pack of battery cells or other battery arrangements. The second stage involves a dual active bridge comprising a first H-bridge coupled between the first positive bus and the second positive bus. The dual active bridge further includes a second H-bridge coupled between a second positive bus and a second negative bus. The battery may be connected between the second positive bus and the second negative bus. Finally, the second stage includes a transformer coupled between the first H-bridge and the second H-bridge. The transformer isolates the first positive bus and the first negative bus from the second positive bus and the second negative bus.

During operation, the first stage providing power factor correction and a voltage boost of the source of power to the link storage while charging the battery and inverting when providing power to the line or the load from the battery and the second stage provides a controllable charge current to the battery while charging the battery and providing a voltage boost of a voltage of the battery to the link storage while inverting the power from the battery.

These and other aspects of the present disclosure are discussed in more detail below.

DETAILED DESCRIPTION

Aspects of the present disclosure involve a bidirectional inverter-charger system that uses common components for both inverter and charger functions, as well as unidirectional charger systems. In one application, the inverter-charger is employed in a plug-in hybrid electric vehicle or electric vehicle application, internal or external to the vehicle, and provides for charging a vehicle battery or other rechargeable energy storage device and also allows the battery to be connected to an electric power grid to deliver power to the grid or otherwise be a source of power. In charge mode, the inverter-charger is coupled with an alternating current (AC) power source, such as a conventional 120V or 240V wall outlet, and the AC power is converted to direct current (DC) for charging the battery coupled with the inverter-charger. Thus, "charging" is a term used herein that describes when the system is configured to convert the alternating current from the line to direct current to charge a battery pack. In inverter mode, the same inverter-charger reverses the flow of energy and converts DC power from the battery to AC power for the grid or otherwise. Thus, "inverting" is the term that describes when the system is configured to convert the direct current voltage from the battery pack to alternating current to couple the battery pack to the grid. Alternatively the inverter-charger may be configured to provide a power source. For example, through use of the inverter-charger, an electric or hybrid vehicle battery or a stand-alone battery system can be used as a power supply, in place of a conventional generator, when power to a home or the like is down or when the home or other facility is "off the grid." Thus, by employing an inverter-charger system, a vehicle battery or other energy storage system may act as energy source for use in powering a vehicle or other system and may also act as an energy source to deliver power to the grid, a home, and for numerous other possible uses where an AC power source is needed. While some examples of possible uses of the inverter-charger are described, the inverter-charger may be configured for and used in nearly any application where electrical energy is transferred between a DC energy storage platform and an AC system.

Figure 1:
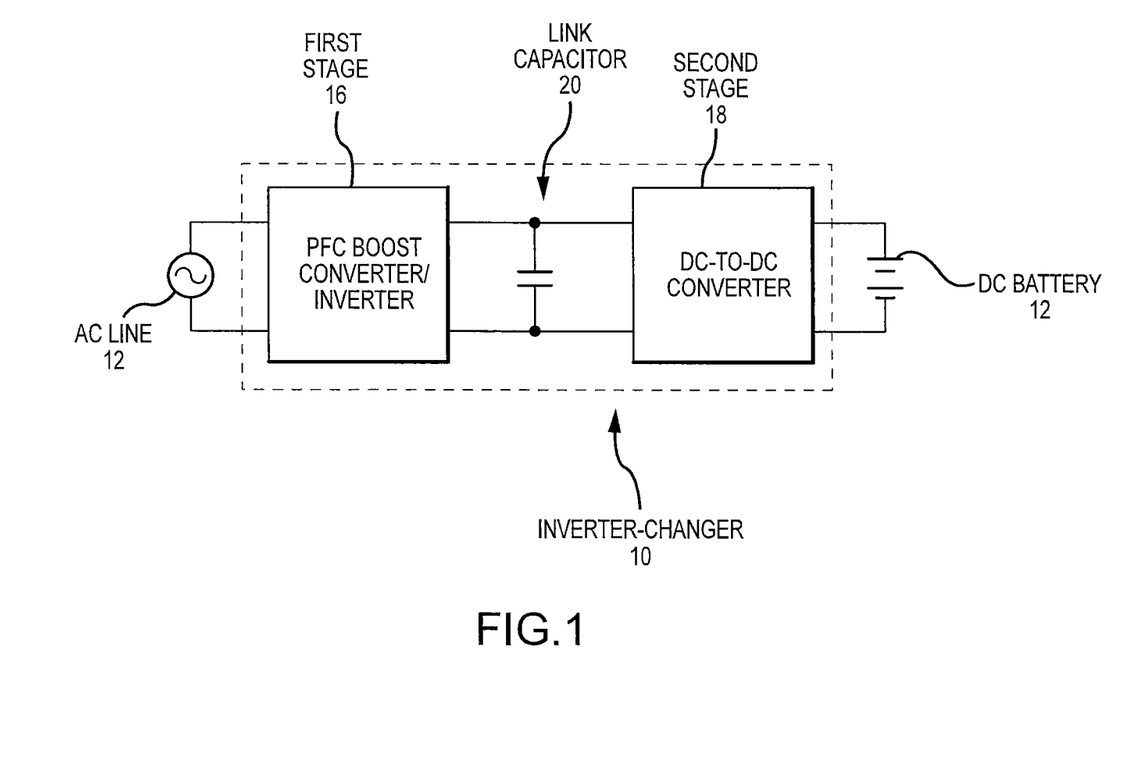
FIG. 1 is a block diagram illustrating a two stage bidirectional inverter-charger coupled between an AC line and a battery pack.

FIG. 1 is a high level block diagram of one example of an inverter-charger system 10 as might be used to bidirectionally control the flow of electrical energy between an AC source 12 and an energy storage 14. The inverter-charger is functionally positioned between the energy storage (e.g. a battery pack) and the alternating current supply. The battery pack may have a direct current voltage of between 150 and 400 volts; however, the inverter-charger may be used with packs having other voltages, whether higher or lower than the examples used herein. The various possible battery packs are often represented by a nominal or peak voltage, and may be lower when in a discharged state or higher during charging. The alternating current supply may be between 85 volts and 264 volts at 60 hertz (Hz), with typical residential U.S. line voltages being nominal 120 VAC or 240 VAC. Of course, the system may also be configured for other line voltages such as at 100 volt at 50 Hz or 60 Hz (Japan) and 200 volt at 50 Hz (Europe). The inverter-charger can also be configured to provide AC energy to power loads or used as an emergency or auxiliary power source. The inverter-charger can also be configured to utilize DC voltages such as from a wind turbine, solar panel array or DC charging stations.

Figure 2A:
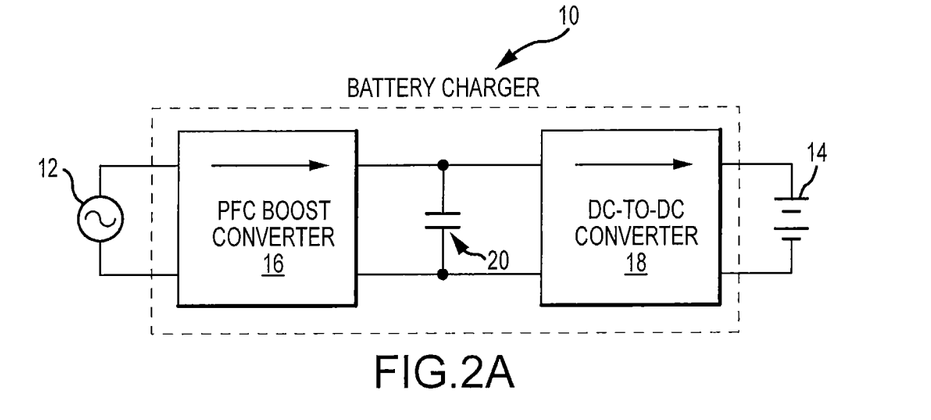
FIG. 2A is a block diagram illustrating the bidirectional inverter-charger of FIG. 1 configured as a battery charger.
Figure 2B:
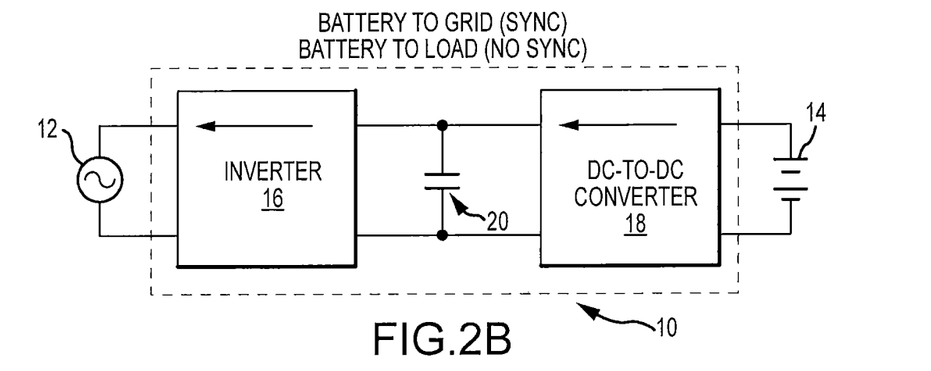
FIG. 2B is a block diagram illustrating the bidirectional inverter-charger of FIG. 1 configured as a synchronized battery to grid inverter or non-synchronized battery to load inverter.

The inverter-charger 10 has two stages (16, 18) separated by a link capacitor 20, which may be implemented as a bank of capacitors, or a collection of capacitors. The first stage 16 is a power factor correcting boost converter/inverter. FIG. 2A illustrates the inverter-charger in charge mode. FIG. 2B illustrates the inverter-charger operating in inverter mode. Generally speaking, in charge mode, the first stage provides power factor correction and boosts the line voltage sufficiently to charge the battery pack with a specified charge current. In inverting mode, the first stage acts as an inverter to convert DC voltage at the link, to an AC waveform. The second stage 18 is a DC-to-DC converter, which may be isolated. Generally speaking, in charge mode, the second stage uses the boosted voltage from the first stage to provide the appropriate charge current to the battery. In inverting mode, the second stage provides the proper DC voltage for the inverter stage.

The inverter-charger system 10 may be deployed in conjunction with a plug-in hybrid or electric vehicle having a battery pack. The inverter-charger, however, may be deployed in other systems where bidirectional coupling between AC and DC energy supplies/storage are required. For example, the AC or DC supply may be provided from a wind turbine array, or a solar array. In such an example, it is quite possible that the battery may be used for energy storage when energy from the turbine is not available (not windy). In a facility, whether a home or otherwise, or in a grid power generation arrangement (e.g., a wind farm), with a wind turbine or turbines providing power to the facilities energy grid or a utility scale grid, a plug-in hybrid battery, a group of vehicles and respective batteries, or a stand-alone battery system or other energy storage system, may be connected to the grid and be charged from energy supplied at least in part from the wind turbine(s). When the turbine or turbines are not delivering energy, the battery may be used to provide energy for the power needs of the facility. Further, numerous such possible uses will evolve as smart grid, battery system density, other energy storage systems, and other such technologies are developed and deployed.

Figure 2C:
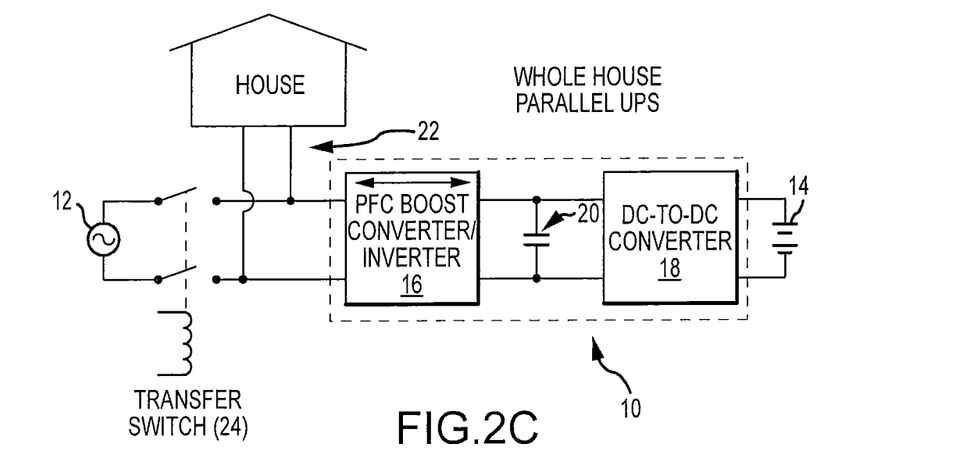
FIG. 2C is a block diagram illustrating the bidirectional inverter-charger of FIG. 1 configured as an alternative power supply for a facility, such as a home.

FIG. 2C is a diagram illustrating the inverter-charger 10 coupled with a home junction box 22 and the grid 12. Note, while a home is shown, the junction box (or electrical panel) may be associated with any number of possible facilities including businesses, manufacturing facilities, data centers, etc, and is where 240 VAC, 120 VAC, or other circuits for a facility are linked with grid power. In this specific example, a transfer switch 24 is positioned between the grid and the junction box such that the grid may be isolated from the home and the inverter-charger coupled, through the transfer switch, to the home junction box. In this example, the vehicle battery or other storage source may be coupled with the home and junction box such that inverter-charger provides 240 VAC to the junction box in place of that conventionally provided by the grid. Such an arrangement might be useful in the event of a power failure. If the grid connection is provided by a solar array or wind turbine, such as should the home not be connected with a conventional grid, then the vehicle battery and inverter-charger may provide power to the home when it is not sunny, at night, and/or times of low wind.

Figure 3:
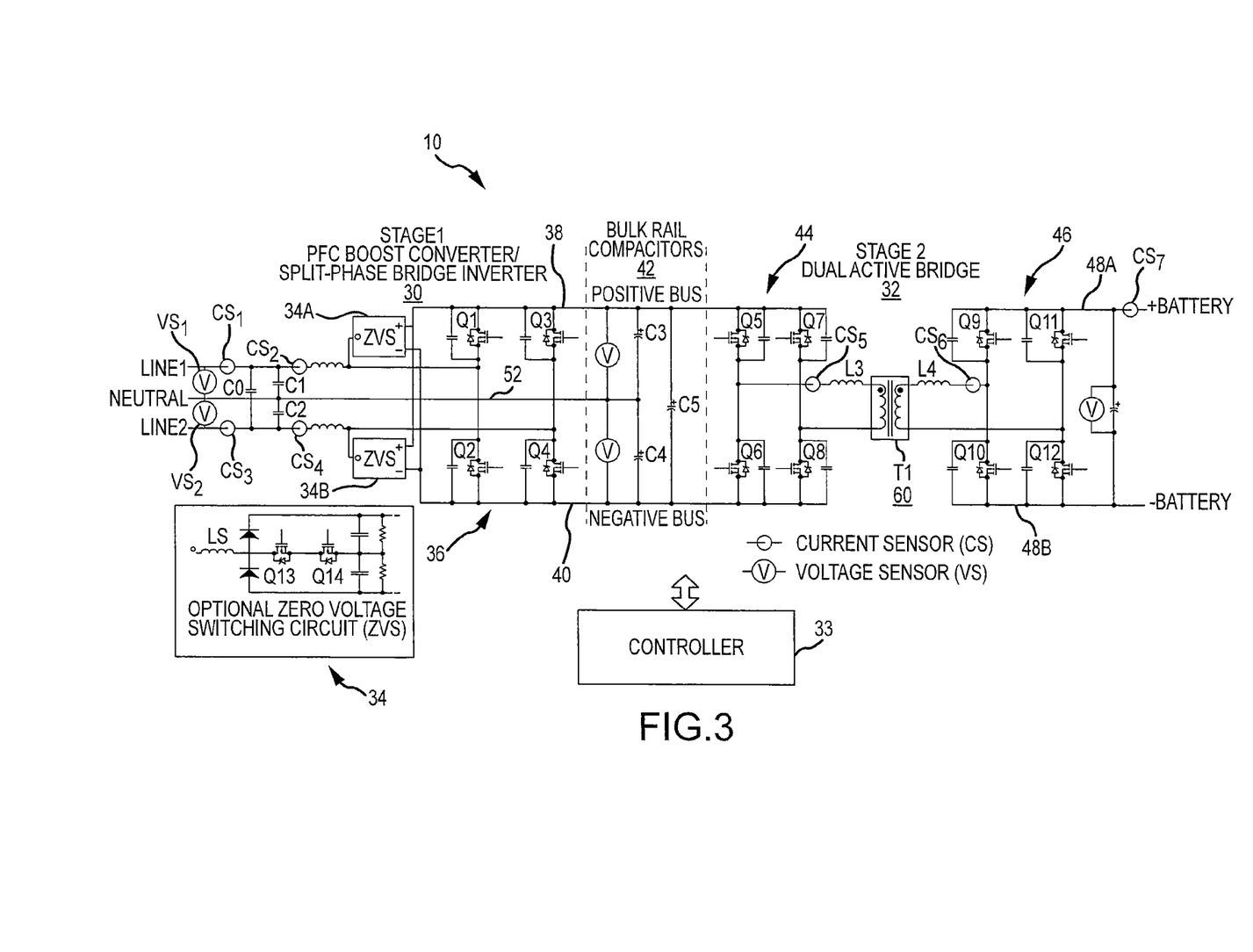
FIG. 3 is an electric schematic diagram of one example of a bidirectional inverter-charger.

FIG. 3 is an electrical schematic of one possible implementation of an inverter-charger 10 conforming to aspects of the present disclosure. The inverter-charger includes several switches (labeled Qx) that may be implemented as metal-oxide-semiconductor field-effect transistors (MOSFET's), insulated gate bipolar transistors (IGBT's), mixed MOSFET's and IGBT's or other power switching components as might be appropriate. A MOSFET intrinsically includes a diode, which may have a voltage drop of 0.6 volts, but diodes with a lower voltage drop may be added depending on the particular requirements of a given implementation. Diodes may be internal or external to IGBT's.

In one possible specific implementation, the inverter-charger includes two stages. A first stage 30 provides power factor correction and a voltage boost while charging, and power factor correction and inversion while in inverter mode. A second stage 32 provides DC-to-DC conversion. The first stage may operate at one frequency with the second stage operating at another. Each stage has a natural resonant operating frequency that is a combination of inductance, capacitance, and resistance, along with the power requirements of each circuit. The frequencies can be adjusted by choosing parts to make a certain frequency or to just operate the switching at or near its natural frequency. At higher frequencies, such as 40 kHz and greater, MOSFETS are usually employed. At lower frequencies, MOSFETS or IGBT's may be used. Magnetic components, such as inductors L1, L2, L3, and L4, and transformer T1, are specified to conform to the currents and switching frequencies of a given implementation. Higher currents generally require larger wires and cores used in the inductors and transformers. Higher frequencies, however, allow for use of smaller components relative to lower frequencies.

Switch control and monitoring may be performed with one or more microcontrollers, and monitoring circuits 33 such as microprocessors, PWM controllers, current and voltage sense circuitry, comparators, proportional integral controllers and the like. Connections and feedback loops may exist between the various switching elements, current sensors, voltage sensors, positive and negative rails (also referred to as buses) of stages one and two, and throughout to system. To not unnecessarily complicate the drawings, the various discrete control elements and the various interconnections are not shown. The system may be connected, such as with a serial interface or network to some control system such as an on-board-computer in a vehicle or home power control center. The inverter-charger may charge a bank of high density capacitors and/or a bank of batteries, which may include a balancing or control system to maintain proper charging and discharge and may need to interface with this inverter/charger to regulate limits.

Figure 3A:
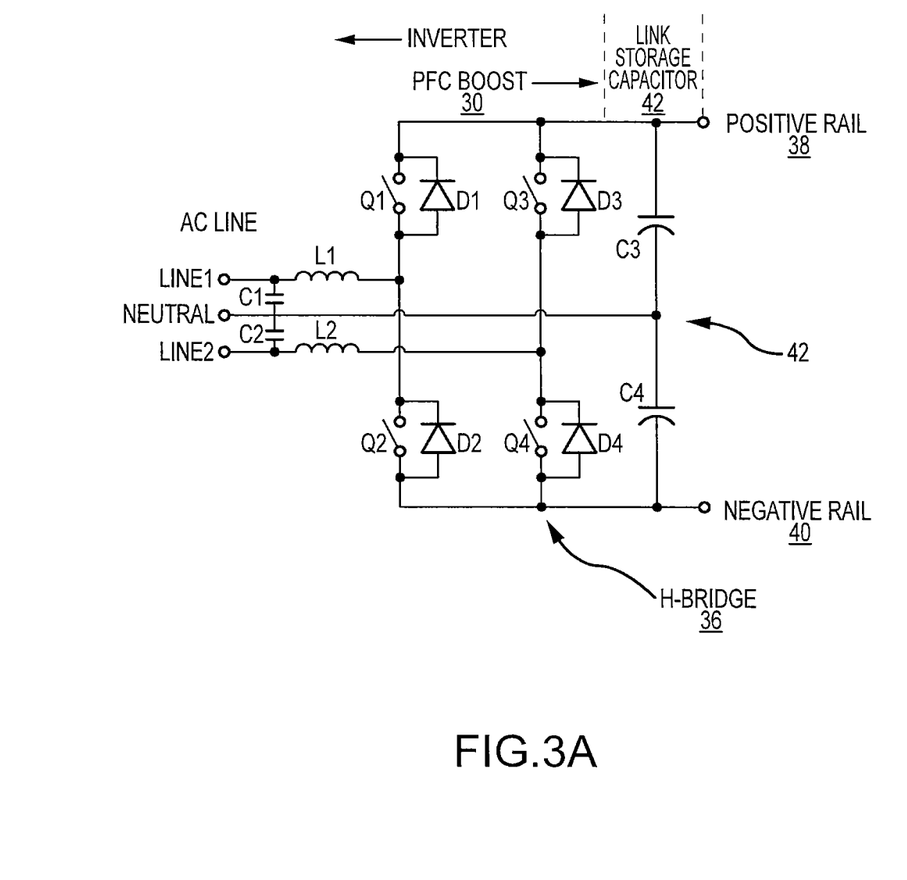
FIG. 3A is an electrical schematic diagram of a first example of a power factor correcting boost/inverter stage of a bidirectional inverter-charger, the input stage configured particularly for coupling with a split phase (e.g., 240 VAC) AC line with neutral.

The first stage 30 of the inverter-charger of FIG. 3 provides power factor correction and boost in charge mode, as mentioned above. FIG. 3A is a diagram illustrating one particular example of the first stage and is substantially similar to the first stage illustrated in FIG. 3 with the exception that FIG. 3 also illustrates a pair of zero voltage switching circuits 34A, 34B. Referring now to FIG. 3A, and the wave form shown in FIG. 5, power factor corrected boost will be described. The first stage includes a set of input capacitors C1 and C2 along with a set of input inductors L1 and L2 connected with a split phase bridge rectifier 36. More particularly, a first inductor L1 is connected between a first power line and a first portion of the split phase bridge. The first portion of the bridge is at the interconnection between switches Q1 and Q2, which are discussed in more detail below. A second inductor L2 is connected between a second power line and a second portion of the split phase bridge (the interconnection between switches Q3 and Q4). The input stage further involves a first capacitor coupled between the first line and a neutral line and a second capacitor coupled between the second line and the neutral. Also, a third capacitor C0 may be positioned between the rails.

The first stage bridge is a split phase bridge, which may also be an H-bridge, and it includes four switches Q1-Q4 connected in an H-bridge arrangement between a positive 28 and negative 40 rail of the inverter-charger. The first stage is coupled with a link capacitor arrangement 42, which FIG. 3A includes capacitors C3 and C4 connected between the rails. In FIG. 3, an additional capacitor C5 is also shown connected to the rails. The first stage is connected with a split-phase 240 volt AC line, such as commonly found in homes in the United States, with each power phase of the line connected to the inductor (boost) coils L1 and L2, respectively. The inductor coils are connected to the H-bridge and a neutral line of the source is coupled with a common connection of the C1, C2, C3 and C4 capacitors.

Figure 5:
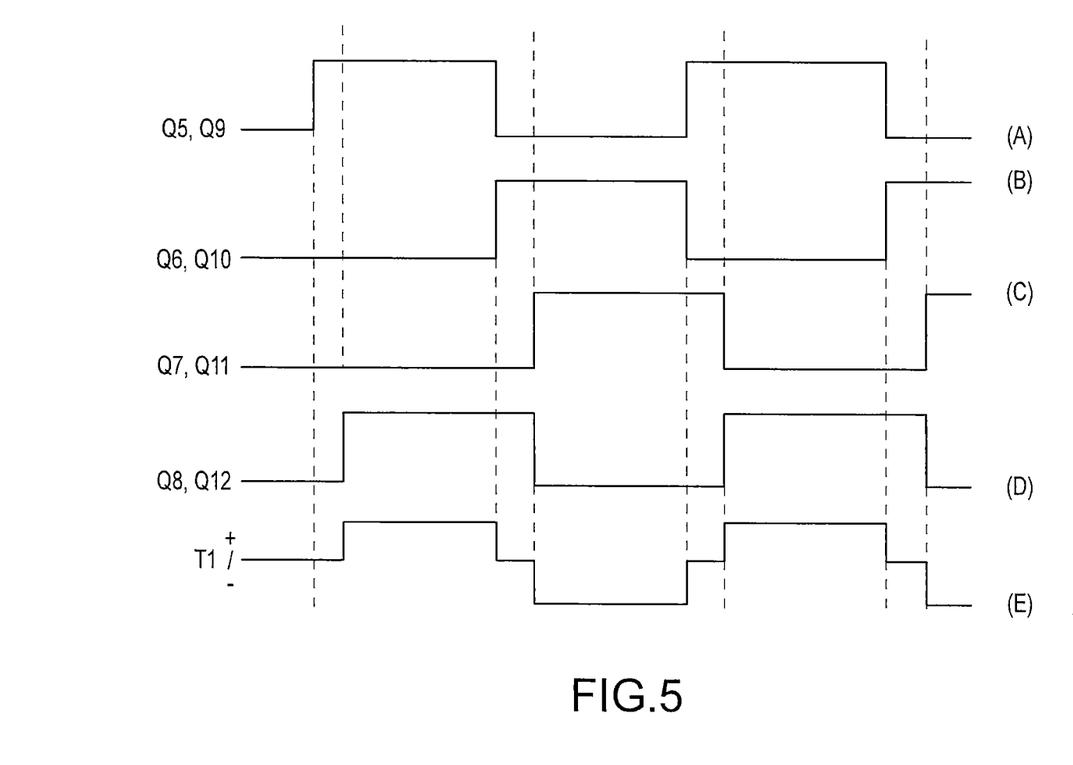
FIG. 5A illustrates a gate drive waveform for bridge switches Q5 and Q9 of FIGS. 3 and 4.
FIG. 5B illustrates a gate drive waveform for bridge switches Q6 and Q10 of FIGS. 3 and 4.
FIG. 5C illustrates a gate drive waveform for bridge switches Q7 and Q11 of FIGS. 3 and 4.
FIG. 5D illustrates a gate drive waveform for bridge switches Q8 and Q12 of FIGS. 3 and 4.
FIG. 5E illustrates a waveform of the transformer voltage when the bridges are driven as illustrated in FIGS. 5A-6D.
Figure 6:
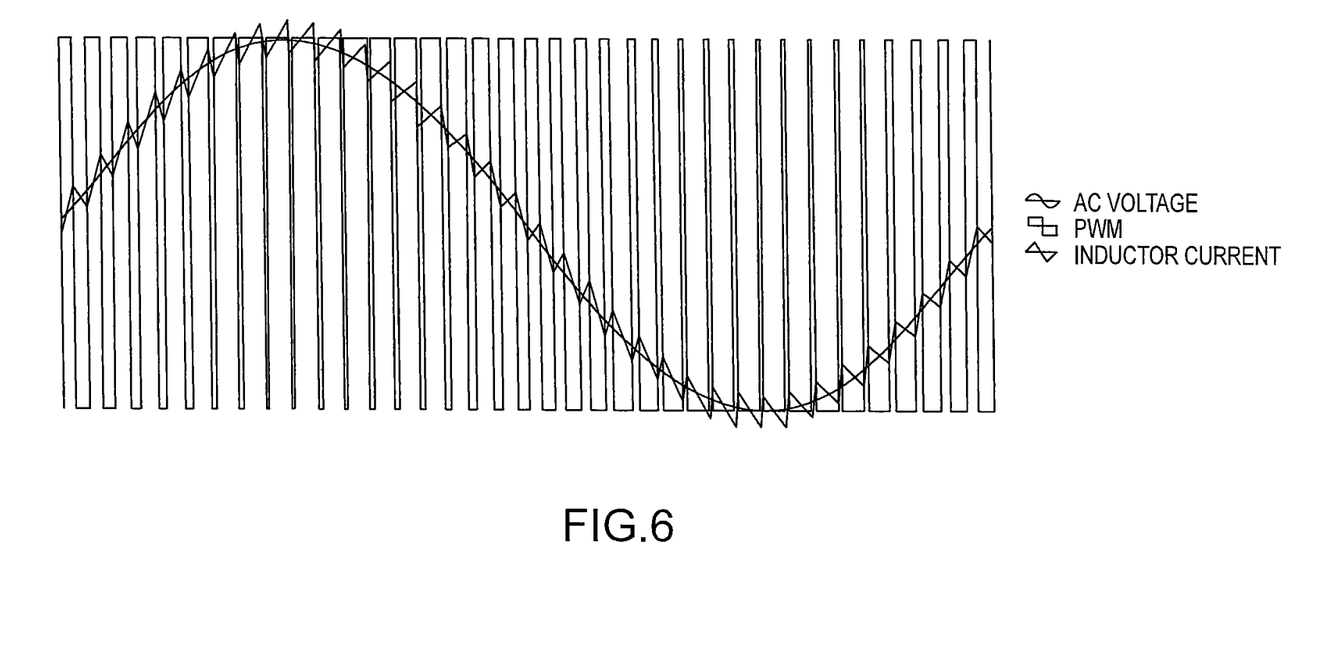
FIG. 6 is an AC line voltage waveform to which the inverter output may be synchronized in a grid-tie configuration overlaid with three waveforms illustrating the pulse width modulated gate drive signals for inverter bridge switches Q1, Q4 (active during the positive portion of the line voltage waveform shown in and inverter bridge switches Q2, Q3 (active during the negative portion of the line voltage waveform), and a waveform of a reference current overlaid with a waveform of a boost inductor current of the boost/inverter stage shown in FIG. 3A.

Each of the switches Q1-Q4 may include diodes D1-D4 across the switches. As noted above, MOSFET switches intrinsically include diodes in the arrangement shown. However, additional diodes or diodes across IGBT switches may also be implemented. When an AC voltage is applied to the bridge with no activation of the switches Q1, Q2, Q3 and Q4, the AC voltage will be rectified through diodes D1, D2, D3 and D4 to a bus voltage of 340 volts DC between the top of capacitor C3 and the bottom of C4 (i.e., approximately 340 volts DC will be available between the positive and negative rails (38, 40)). The first stage 30 operates at about 25 kHz in one specific implementation. At the beginning of each 25 kHz cycle, the microcontroller turns on switches Q2 and Q4 causing current to increase in coils L1 and L2. The microcontroller monitors the line voltage, line current and bus voltage (rail voltage). A reference current limit value is derived that tracks the line voltage and is scaled by the desired bus voltage, which in one example may be 380 VDC. When the inductor current equals or substantially equals the reference current limit, the microcontroller or control device turns switches Q2 and Q4 off. When Q2 and Q4 are switched off, the current of the inductors changes direction such that a boost voltage is available. The coil voltage will increase until the current can discharge through diodes D1 and D4 (on a positive portion of the AC line cycle) or D2 and D3 (on a negative portion of line cycle) depending on the polarity of the line. Additional efficiency can be had if the switches Q1-4 are turned on when the corresponding diodes D1-4 would be conducting. This is synchronous rectification. This general sequence is repeated again at the next 25 kHz cycle. As shown in FIG. 5, following this operation through an AC wave, the average line current will follow the line voltage resulting in an improved power factor and increased bus voltage. In one example, a 380 volt potential between the rails is provided. Instead of Q2 and Q4 being used for the switch, Q1 and Q4 could also be used. Additionally, the pairs could be alternated to spread work and heat equally amongst the 4 switches. Another method is to use diagonal switch pairs Q2 and Q3 during Line 1 positive cycles and Q1 and Q4 during Line 1 negative cycles.

Figure 4:
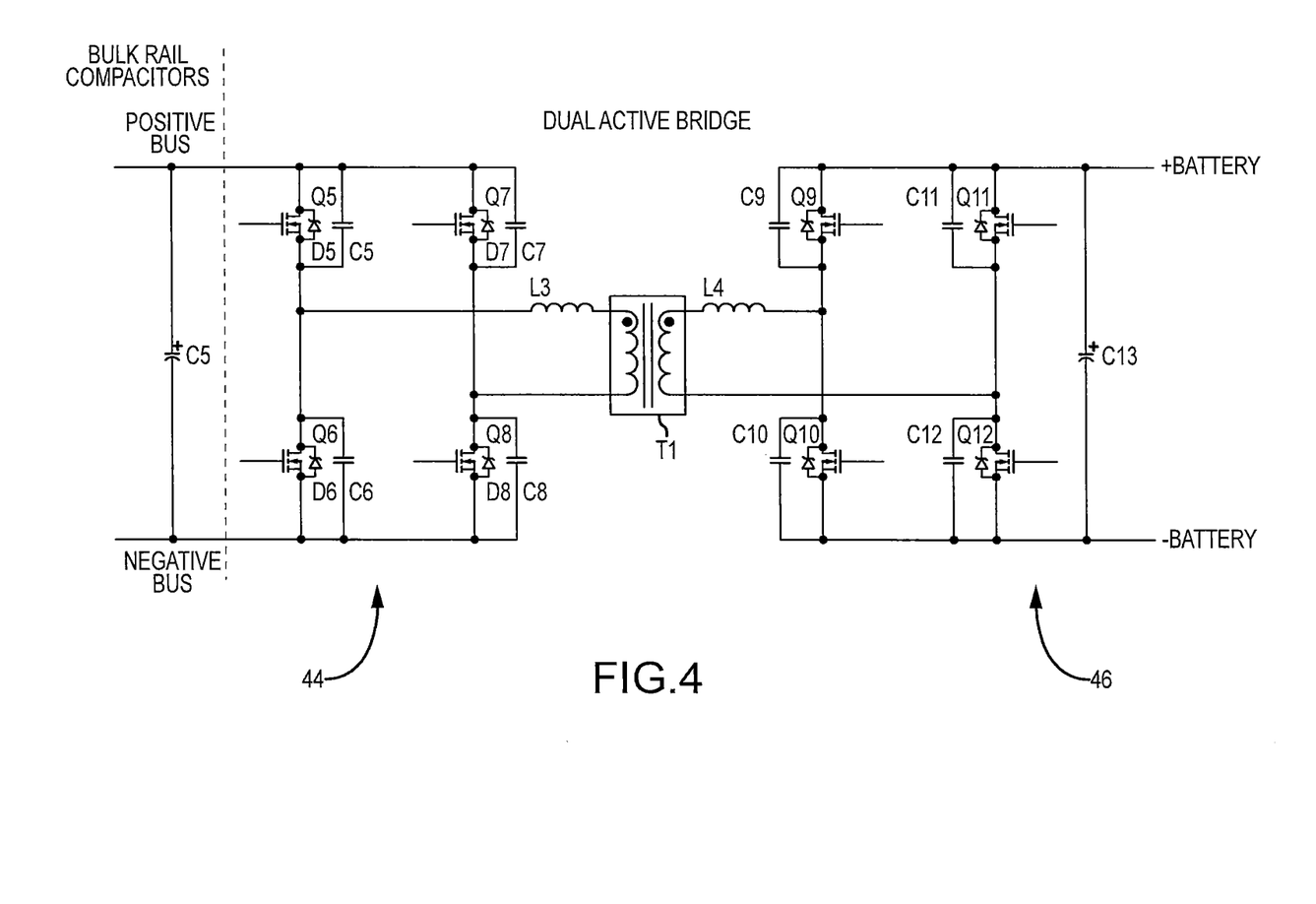
FIG. 4 is an electrical schematic diagram of one particular implementation of an isolated bidirectional DC-to-DC converter stage of a bidirectional inverter-charger.

Referring now to FIGS. 2A, 3, 4, and the gate drive waveforms shown in FIG. 5, DC-to-DC conversion will be described. Stage two 32 of the inverter-charger is coupled between the DC link capacitor(s) 42 and the battery, and includes two H-bridge rectifiers (44, 46) on either side of a transformer T1. The first H-bridge 44 includes switches Q5-Q8 along with respective diodes D5-D8 and capacitors C5-C8 across the switches. The second H-bridge includes switches Q9-Q12 along with respective diodes D9-D12 and capacitors C9-C12 across the switches.

To provide isolation, the DC-to-DC converter of stage 2 includes a transformer. In one possible implementation, the transformer is not a 1:1 transformer, although a 1:1 transformer or similar may be employed. In such an implementation, the ratio of turns between the primary windings of the transformer and the secondary windings of the transformer may be determined by the ratio of the nominal bus voltage to the nominal battery voltage. For example, if the nominal bus voltage is 380 volts and the nominal battery voltage is 250 volts, then the turns ratio of the primary winding to the secondary winding may be 38:25 with the size of the wire and the number of actual turns determined by the power requirements and transformer core material. As discussed herein, a possible implementation may include link (leakage) inductors which may cause an alteration in the winding ratio.

As discussed herein, in one specific implementation a bus (rail) voltage of about 380 volts DC is produced by the first stage and the link capacitor(s) is charged to a nominal 380 VDC. A ripple of about +/−10 VDC may be present at the link, depending on the implementation. FIG. 5(A) is the control waveform for switches Q5 and Q9, FIG. 5(B) is the control waveform for switches Q6 and Q10, FIG. 5(C) is the control waveform for switches Q7 and Q11 and FIG. 5(D) is the control waveform for switches Q8 and Q12. Finally, FIG. 5(E) is the voltage waveform for the transformer T1. As shown in FIG. 5(A), at the beginning of a 40 kHz cycle, the microcontroller or other form of control turns on switch Q5. Initially, with Q8 open, capacitor C8 charges to the rail voltage and also discharges any charge within C7. After a phase delay time, shown in the difference between the rising edge of the waveform of FIG. 5(A) relative to FIG. 5(D), related to a specified percentage of full power for charging, the microcontroller turns on Q8 inducing a current flow within the transformer. More specifically, with Q8 turned on and Q5 remaining on, a current flows through coil L3 and the primary winding of transformer T1 which induces a current flow in the secondary winding of T1 transformer and coil L4.

Operation of the second H-bridge may involve inactive or active rectification. If switches Q9, Q10, Q11 and Q12 are left off, the current will be rectified through diodes D9 and D12 into capacitor C13 and/or the battery B1. If the switching of Q9 mirrors that of Q5, Q10 mirrors Q6, Q11 mirrors Q7 and Q12 mirrors Q8, synchronous rectification can take place with a corresponding increase in efficiency due to lower voltage drops in the secondary switches Q9, Q10, Q11 and Q12 than in the secondary diodes D9, D10, D11 and D12.

When half of the 40 kHz cycle is completed, the microcontroller turns off switch Q5 as shown in FIG. 5(A). While switch Q8 is still on (as shown in FIG. 5(D)), energy stored in the leakage inductance (represented by L3) charges C5 and discharges C6 until the return voltage passes below the negative rail or zero, forward biasing D6. This return voltage will continue to be held near or below zero as long as inductor L3 has stored energy. Switch Q6, as shown in FIG. 5(B) is turned on during this interval with no voltage across it, resulting in zero-voltage-switching. When half of the 40 kHz cycle is completed and accounting for the phase delay, the microcontroller turns off switch Q8 (FIG. 5(D)). While switch Q6 is still on, energy stored in the leakage inductance (represented by L3) charges capacitor C8 and discharges capacitor C7 until the return voltage passes above the bus (positive rail), forward biasing D7. This return voltage is held at this elevated voltage level as long as L3 has stored energy. Hence, while the initial switching of Q5 and Q8 may be considered hard switches, subsequent operation is soft switching (switching with zero or little voltage across the switch) resulting in substantially less strain on the switches.

Referring again to FIGS. 5B and 5C, switch Q7 is turned on during the interval of switch Q6 being on such that leakage inductor L3 pushes up the return voltage so that no voltage is across Q7, resulting in zero-voltage-switching. When half of the 40 kHz cycle is completed, the microcontroller turn switch Q6 (FIG. 5B) off and while switch Q7 (FIG. 5C) is still on, energy stored in the leakage inductance L3 is released to charge capacitor C6 and discharge capacitor C5 until the return voltage passes above the bus, forward biasing D5. The high positive rail voltage will be held as long as inductor L3 has stored energy. Switch Q5 is turned on during this interval with no voltage across it, resulting in zero-voltage-switching. If the phase delay is reduced to near zero, the result would be hard switching, with high voltages across the MOSFET's during switching and a corresponding increase in switching losses, so care must be exercised not to make these component values and subsequent losses any larger than necessary to carry out their respective functions. Excess leakage inductance and parallel capacitance across MOSFET's also increase loses.

Referring to FIGS. 2B, 3 and 4, DC-to-DC conversion as described above with reference to FIGS. 5(A)-5(E) can be reversed, taking power from the source battery and charging the bus to be used in subsequent inverter operation. The inverter-charger may be configured for grid-tie inverting as well as off-grid inverting. Generally speaking, grid-tie inverting refers to coupling the battery to a grid whereas off-grid inverting refers to using the battery to provide an AC source independent or otherwise not connected to a grid.

First, grid tie inverting is described with reference to FIGS. 2B, 4, 5A and 5B. Monitoring circuitry (not shown) determines the proper line voltage, line current, line frequency and zero-crossing points. The microcontroller(s), with input from the monitoring circuitry, calculates a line reference current corresponding to a specified power to send into the line for each point of a switching frequency. In the example of 25 kHz, at a positive voltage transition of the line, the microcontroller turns on switches Q1 and Q4 until the measured line current equals the reference line current for a particular portion of the source waveform. Switches Q1 and Q4 are then repeatedly cycled on and off for each 25 kHz cycle through the positive half of the sine wave to provide a line current substantially equaling the reference measured line current, as shown in FIG. 5B. With the following negative voltage transition of the line (FIG. 5A), the microcontroller turns on switches Q2 and Q3 until the measured line current equals the reference line current for this part of the sine wave. Similarly, switches Q2 and Q3 are cycled on and off, for each 25 kHz cycle through the negative half of the sine wave. The pulse-width-modulated currents through both halves of the sine wave are averaged in the coils L1, L2 and capacitors C1, C2 to provide a filtered average line current synchronized with the AC line voltage.

Second, off-grid inverting is described with reference to FIGS. 2B, 4, 5A and 5B. In this configuration, monitoring circuitry determines the proper line voltage, line current, line frequency and zero-crossing points. The microcontroller, with input from the monitoring circuitry, calculates a positive and negative line reference voltage for each point of a specified switching frequency (e.g., 25 kHz). Starting with a positive voltage transition of the line, the microcontroller turns on switches Q1 and Q4 until the measured line voltage of each line phase equals the reference line voltage for the particular portion of the sine wave, comparing positive for switch Q1 and negative for switch Q4. This operation is repeated for each 25 kHz cycle through the positive half of the sine wave. With the following negative voltage transition of the line, the microcontroller turns on switches Q2 and Q3 until the measured line voltage of each line phase equals the reference line voltage for the particular portion of the sine wave, comparing negative for Q2 and positive for Q3. This operation is repeated for each 25 kHz cycle through the negative half of the sine wave. The pulse-width-modulated voltages will be averaged in the coils L1, L2 and capacitors C1, C2 to provide a split 240 volt (2 complimentary 120 volt lines relative to neutral) filtered line voltage to the load.

Referring to FIG. 3 and further explaining certain features of the circuit 10 from left to right, i.e. from the AC source 12 to the battery 14, the inverter-charger 10 may include an additional external line filter (not shown) connected to the source 12. The line filter attenuates or otherwise reduces electromagnetic interference between the line and the inverter-charger. Inductors L1 and L2 are coupled in series between each line and the boost converter/inverter bridge 36. Capacitor C0 is connected between line 1 and line 2, C1 is connected between line 1 and neutral while C2 is connected between line 2 and neutral. Capacitors C1 and C2 help reduce differential noise while C0 reduces common-mode noise.

The PFC boost converter/inverter 30 is coupled with the AC Source 12. As mentioned above, the inverter-charger may include a line filter, in which case the PFC boost converter/inverter is coupled with the line filter. The PFC boost converter/inverter is arranged as a split phase bridge and includes four transistor switch configurations Q1-Q4 arranged as an H-bridge. The H-bridge configuration allows for bidirectional energy flow through the circuit. Hence, with the H-bridge under programmatic control and with pulse width modulated (PWM) signals fed to the gate of each MOSFET transistor, the circuit may be operated as a PFC boost converter in charge mode, and as a synchronized inverter in inverter mode. Generally speaking, in discharge or inverter mode, the rail voltage at the link capacitor 42 of the bridge is monitored and voltage adjustments are made to keep it within whatever tolerance is specified. Additionally, the output current waveform is compared to the AC source waveform and adjustments in the PWM signals to the bridge MOSFETS are made such that the output current waveform matches the AC source voltage waveform as closely as possible for synchronization resulting in a high power factor. The inverter is not an unfolder or otherwise configured to unfold a pulsating DC waveform.

In one particular implementation, each switch Q comprises one or more n-channel power MOSFETS connected in parallel. Switch Q1 has its drain connected to a positive rail 8 and its source connected through the inductor L1 to one phase of the AC line. Switch Q3 has its drain connected to the positive rail 8 and its source connected through the inductor L2 to the other phase of the AC line. Switch Q3 has its drain connected to the same inductor L1 as Q1 and its source connected a negative rail 36. Finally, switch Q4 has its drain connected to the same inductor L2 as Q2 and its source connected to the negative rail 36. The gates of each switch Q1-Q4 receives a control signal from a controller (not shown), which may be in the forms of pulse width modulated signals, to control when the switches are on or off.

In one implementation, to avoid having switches Q1 and Q3 or Q2 and Q4 on and conducting at the same time, the PWM control signals may provide a dead band between each complimentary bridge pair so they are never on at the same time, shorting the rail supply.

Figure 3B:
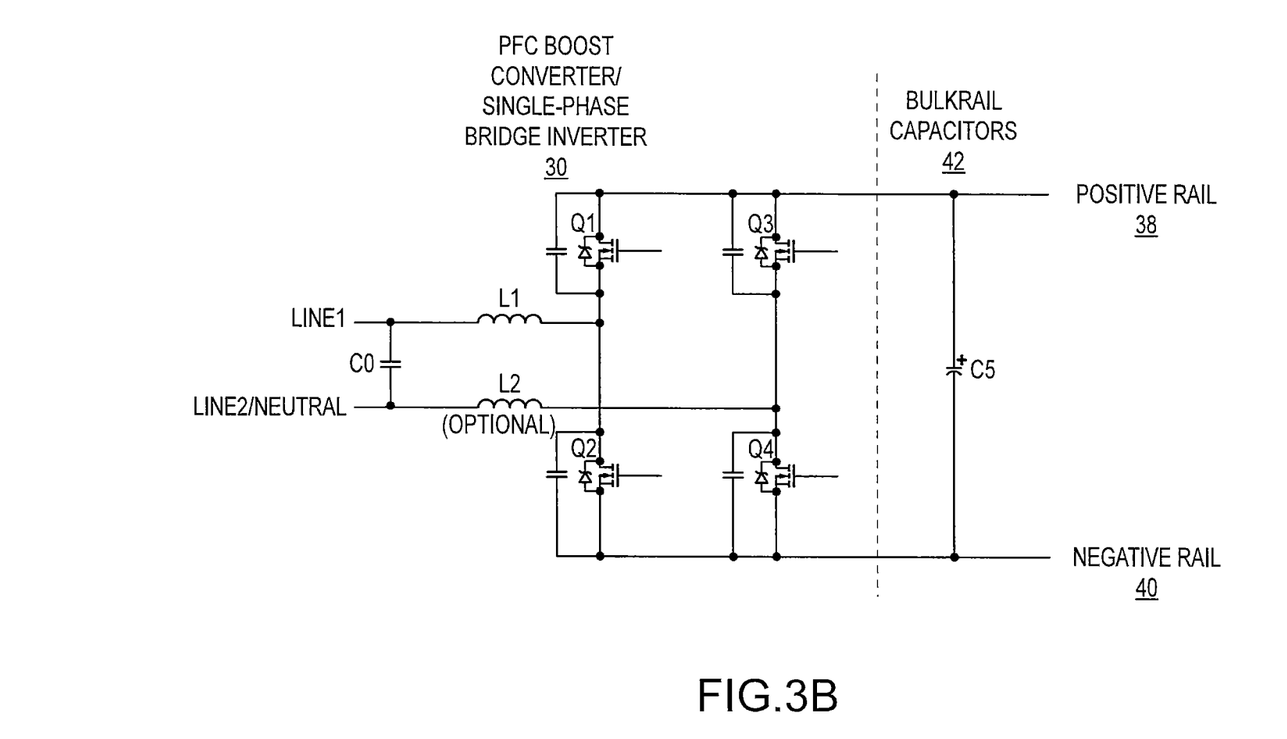
FIG. 3B is an electrical schematic diagram of a second example of a power factor correction boost/inverter stage of a bidirectional inverter-charger, the input stage configured particularly for coupling with a single phase (e.g., 120 VAC) AC line.

FIG. 3B is an electrical schematic of another example of an input stage of a bidirectional inverter-charger providing power factor correction and boost during charge and inverting, the input stage configured particularly for coupling with a single phase (e.g., 120 VAC) AC line. A single or double coil arrangement may be used. More specifically, a first inductor L1 is connected between a first power line of a conventional 120 VAC outlet and a first portion of the first H-bridge. In this example, the first portion of the H-bridge is a point of interconnection between a first switch Q1 and a second switch Q2. A second inductor L2 is connected between a second power line and a second portion of the first H-bridge. In this example, the second portion of the H-bridge is the point of interconnection between switches Q3 and Q4.

Figure 3C:
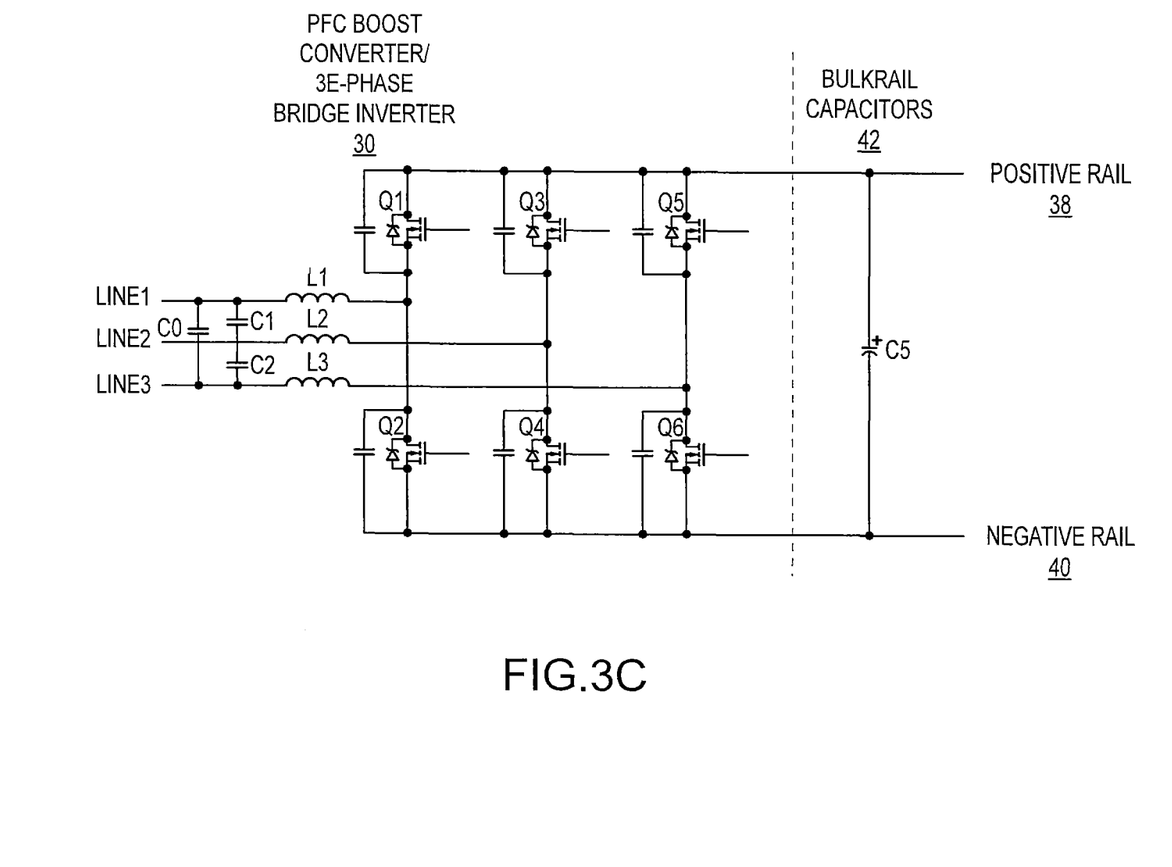
FIG. 3C is an electrical schematic diagram of a third example of a power factor correction boost/inverter stage of a bidirectional inverter-charger, the input stage configured particularly for coupling with a three phase AC line as well as single and split phase AC lines.

FIG. 3C is an electrical schematic of yet another example of an input stage of a bidirectional inverter-charger providing power factor correction and boost during charge and inverting, the input stage configured particularly for coupling with a three phase AC line as well as single and split phase AC lines. FIG. 3C illustrates a three phase bridge inverter with switches Q1 through Q6. The input (or output depending on the flow energy) stage to the three phase bridge inverter includes a first inductor L1 coupled between a first line of a three phase energy supply and a first portion of the three phase bridge inverter. The first portion of the three phase inverter is between switch Q1 and switch Q2. The input stage also includes a second inductor L2 coupled between a second line of the three phase energy supply and a second portion of the three phase bridge inverter. The second portion of the three phase inverter is connected between switches Q3 and Q4. Finally, the input sage includes a third inductor L3 coupled between a third line of the three phase energy supply and a third portion of the three phase bridge inverter lying between switches Q5 and Q6.

In the illustrated three phase front end, a collection of capacitors are interconnected between the various lines of the three phase energy supply. More particularly, a first capacitor C0 is coupled between the first line and the third line of the three phase power supply. A second capacitor C1 is coupled between the first line and the second line, and a third capacitor C2 is coupled between the second line and the third line.

Referring again to FIG. 3, the bridge is connected to the capacitor configuration 42 providing a link, with a first set of one or more capacitors C3 connected between the positive rail 38 and the neutral line 52, a second set of one or more capacitors C4 connected between the negative rail 36 and neutral, and a third set of one or more capacitors C5 coupled between the positive 38 and negative 36 rails.

The capacitors provide the voltage for purposes of generating each of the two complimentary 120 VAC sources relative to the neutral, resulting in a total 240 VAC between the line outputs. When inverting to the grid, the output currents will be substantially identical and complimentary. When inverting to a load, each of the complimentary 120 VAC lines may have different loading characteristics but the circuit will still be capable of providing 240 VAC between the lines.

A bi-directional dual active H-bridge 32, including a second 44 and third 46 bridge and associated transformer T1 receives the DC link voltage. The second H-Bridge through controlled operation of its switches provides a square wave input to the transformer during charging.

In one implementation, the transformer is a one-to-one (1:1) transformer. The transformer galvanically isolates the battery side components and the battery from the AC source and source side components. The transformer may include link inductors L3, between the second bridge 44 and the transformer and L4 between the transformer and the third bridge 46. While discussed herein as a 1:1 transformer, other transformer arrangements are possible and may increase or decrease the voltage from the bus voltage or the battery voltage. Besides providing isolation, the transformer 60 and associated bridges 44 and 46 act as a current pump to charge the battery.

The third bridge 46 provides an output voltage and charge current to the battery. The third bridge rectifies the square wave input providing an essentially DC output voltage to the battery side rail 48. A current sense C5 is provided between the bridge 46 and the positive side of the battery. The current sense measures the charge current provided to the battery and provides charge current data to a feedback loop for purposes of maintaining a specified charge current, as discussed herein. In some implementations, the charge current will vary depending on the state of charge of the battery, the battery voltage, battery temperature, and the like. For example, a relatively higher charge current may be provided up to about a 99% state of charge, and then provide a relatively lower current between 99% and 100% state of charge (e.g., a trickle charge).

In inverter mode, the battery 14 provides a DC voltage to the battery side rail 48. The third bridge 46 provides a square wave input to the transformer T1 which in turns provides the square wave output to the second bridge 44. The second bridge rectifies the square wave providing essentially a DC voltage to the source side rail (38, 36) and which also charges the link capacitors 42. The source side rail voltage is maintained at a level sufficient to drive the inverter (split phase bridge) to provide energy back to the grid or load.

In some implementations, zero-voltage-switching circuits (34A, 34B) should be added to the front-end to improve efficiency and reliability. Two switches Q13-14 are connected in a bidirectional mode and switched together. These are connected to a virtual neutral composed of two resistors and two capacitors. The virtual neutral keeps differential currents out of the real neutral line where it could cause electromagnetic interference and may trip ground fault current interrupts (GFCI's). Just before one of the bridge switches Q1-Q4 opens, it's corresponding ZVS circuit is turned on. Current passes through the inductor L5 to the virtual neutral or center voltage point. The switch (Q1-Q4) is then opened allowing the current in L5 to reverse, changing the voltage at terminal O of L5 in the opposite direction, high to low or low to high. Then the complimentary switch (Q1-Q4) closes with very little or no voltage across it. Hence, zero-voltage-switching. The ZVS circuit is then turned off to reduce its load on the circuit. The diodes prevent the terminal of L5, which is connected to the switches Q13-14, from exceeding the rail voltages and protecting the switches Q13-14. Both ZVS circuits will most likely operate at the same time but with opposite voltages on them. These circuits work for both boosting and inverting. Multiple ZVS circuits may use a common or a separate virtual neutral circuit.

Although the present invention has been described with respect to particular apparatuses, configurations, components, systems and methods of operation, it will be appreciated by those of ordinary skill in the art upon reading this disclosure that certain changes or modifications to the embodiments and/or their operations, as described herein, may be made without departing from the spirit or scope of the invention. Accordingly, the proper scope of the invention is defined by the appended claims. The various embodiments, operations, components and configurations disclosed herein are generally exemplary rather than limiting in scope.

The invention claimed is:

1. A bidirectional inverter-charger comprising:
a first stage configured to be coupled between a source of energy or a load and coupled with a link storage, the first stage including at least one inductor coupled with a first bridge receiving control signals from at least one digital controller;
a second stage coupled between the link storage and configured to be coupled with a battery, the second stage including a DC-to-DC converter receiving control signals from the at least one digital controller, the DC-to-DC converter comprising a transformer coupled between a first H-bridge and a second H-bridge, the first H-bridge coupled with the link storage and the second H-bridge coupleable with the battery;
the first stage providing power factor correction and a voltage boost of the source of energy to the link storage while charging the battery and inverting when providing power to the source of energy or the load from the battery;
the second stage providing a controllable charge current to the battery while charging the battery and providing a voltage boost of a voltage of the battery to the link storage while inverting the power from the battery;
while charging the battery, the first H-bridge providing a first square wave to the transformer from the link storage, the transformer providing isolation and providing the first square wave to the second H-bridge, the second H-bridge rectifying the first square wave to provide a specified charge current to the battery;
and while inverting, the second H-bridge providing a second square wave to the transformer from the battery, the transformer providing isolation and providing the second square wave to the first H-bridge, the first H-bridge rectifying the second square wave and providing a voltage to the link storage.

2. The bidirectional inverter-charger of claim 1 wherein the first bridge comprises a split phase.

3. The bidirectional inverter-charger of claim 2 wherein:
the at least one inductor comprises a first inductor coupled between a line of the source of energy and the split-phase bridge and a second inductor coupled between an opposite line of the source of energy and an opposite side of the split-phase bridge;
the split-phase bridge comprising at least four sets of high power semiconductor switches, the control signals driving the split-phase bridge to boost a voltage at the link storage to a specified voltage above a voltage of the source of energy, the boosted voltage provided, in part, by the first inductor and the second inductor, and to provide power factor correction.

4. The bidirectional inverter-charger of claim 1 wherein the first H-bridge comprises four sets of high power semiconductor switches and the second H-bridge comprises four sets of high power semiconductor switches.

5. The bidirectional inverter-charger of claim 1 wherein the at least one digital controller includes a first microcontroller providing control signals to the first stage at one frequency and the same or a second microcontroller providing control signals to the second stage at the same or different frequency.

6. The bidirectional inverter-charger of claim 1 wherein the link storage comprises at least one first capacitor coupled between a positive rail and a neutral line voltage and at least one second capacitor coupled between a negative rail and the neutral line voltage, the at least one first capacitor and the at least one second capacitor providing a link voltage to the second stage.

7. The bidirectional inverter-charger of claim 1 wherein the at least one inductor of the first stage further comprises:
a first inductor connected between a first line of the source of energy and a first portion of the first bridge; and
a second inductor connected between a second line of the source of energy and a second portion of the first bridge;
the first stage further comprising:
a first capacitor coupled between the first line and a neutral line and a second capacitor coupled between the second line and the neutral line.

8. The bidirectional inverter-charger of claim 7 wherein the link storage is connected between a first positive bus and a first negative bus, the link storage comprising a third capacitor connected between the first positive bus and the neutral line and a fourth capacitor connected between the first negative bus and the neutral line.

9. The bidirectional inverter-charger of claim 8 wherein the link storage further comprises a fifth capacitor coupled between the first positive bus and the first negative bus.

10. The bidirectional inverter-charger of claim 2 wherein the at least one inductor of the first stage further comprises:
a first inductor coupled between a first line of the source of energy and a first portion of the first bridge; and
a second inductor coupled between a second line/neutral of the source of energy and a second portion of the first bridge;
the link storage comprising a capacitor coupled between a first positive bus and a first negative bus.

11. The bidirectional inverter-charger of claim 1 wherein the first bridge comprises a three phase bridge inverter and wherein the at least one inductor comprises:
a first inductor coupled between a first line of a three phase energy supply and a first portion of the three phase bridge inverter;
a second inductor coupled between a second line of the three phase energy supply and a second portion of the three phase bridge inverter; and
a third inductor coupled between a third line of the three phase energy supply and a third portion of the three phase bridge inverter;
the first stage further comprising a first capacitor coupled between the first line and the third line, a second capacitor coupled between the first line and the second line, and a third capacitor coupled between the second line and the third line.

12. The bidirectional inverter-charger of claim 1 wherein the first stage includes a first zero-voltage-switching circuit on a first phase-leg of the source of energy and a second zero-voltage-switching circuit on a second phase-leg of the source of energy.

13. The bidirectional inverter-charger of claim 12 further comprising a virtual neutral that is separate from a line neutral.

14. The bidirectional inverter-charger of claim 12 further comprising a half-power point that is separate from a line neutral.

15. A bidirectional inverter-charger comprising:
a first stage including a first inductor operable to be coupled with a first phase leg and a second inductor operable to be coupled with a second phase leg, the first stage further including a split phase bridge including at least four transistor switches with the first inductor coupled between a first transistor and a second transistor of the split phase bridge and the second inductor coupled between a third transistor and a fourth transistor of the split phase bridge, the split phase bridge connected between a first positive bus and a first negative bus;

a link capacitor arrangement comprising a first capacitor coupled between the first positive bus and a neutral line, a second capacitor coupled between the neutral line and the first negative bus, and a third capacitor coupled between the first positive bus and the first negative bus;

a second stage coupled between the link capacitor arrangement and configured to connect with a battery, the second stage including a dual active bridge comprising a first H-bridge coupled between the first positive bus and the second negative bus wherein the battery may be connected between a second positive bus and the second negative bus, a second H-bridge coupled between the second positive bus and a second negative bus, and a transformer coupled between the first H-bridge and the second H-bridge, the transformer isolating the first positive bus and the first negative bus from the second positive bus and the second negative bus;

the first stage providing power factor correction and a voltage boost to the link capacitor arrangement while charging the battery, and inverting when providing power from the battery;

the second stage providing a controllable charge current to the battery while charging the battery and providing a voltage boost of a voltage of the battery to the link capacitor arrangement while inverting the power from the battery;

while charging the battery, the first H-bridge providing a first square wave to the transformer from the link storage, the transformer providing the first square wave to the second H-bridge, the second H-bridge rectifying the first square wave to provide a specified charge current to the battery; and while inverting, the second H-bridge providing a second square wave to the transformer from the battery, the transformer providing the second square wave to the first H-bridge, the first H-bridge rectifying the second square wave and providing a voltage to the link storage.

16. The bidirectional inverter-charger of claim 15 further comprising:

a first zero-voltage-switching circuit on the first phase leg and a second zero-voltage-switching circuit on the second phase leg.

17. The bidirectional inverter-charger of claim 16 wherein the first stage further comprises:

a fourth capacitor coupled between the first phase leg and the neutral line, a fifth capacitor coupled between the neutral line and the second phase leg, and a sixth capacitor coupled between the first phase leg and the second phase leg.

18. The bidirectional inverter-charger of claim 17 further comprising a seventh capacitor coupled between the second positive bus and the second negative bus.

* * * * *